June 4, 1940.　　　　　H. M. WILSON　　　　　2,203,558

THERMOSTAT

Filed June 25, 1937　　　2 Sheets-Sheet 1

Harold M. Wilson,
Inventor,
Delos F. Haynes,
Attorney.

June 4, 1940. H. M. WILSON 2,203,558
THERMOSTAT
Filed June 25, 1937  2 Sheets-Sheet 2

Patented June 4, 1940

2,203,558

UNITED STATES PATENT OFFICE 2,203,558

THERMOSTAT

Harold M. Wilson, Attleboro, Mass., assignor to Metals & Controls Corporation, Attleboro, Mass., a corporation of Massachusetts Application June 25, 1937, Serial No. 150,242

18 Claims. (Cl. 297—12)

This invention relates to thermostats and with regard to certain more specific features, to thermostats adapted to operate in response to rates of temperature change, rather than in response to the attainment of particular temperatures.

Among the several objects of the invention may be noted the provision of a thermostat of the class described which operates in response to a difference of temperature expressed in terms of units of temperature per unit of time, from and at a certain rate, but which, below this rate, is not responsive; the provision of a thermostat of the class described which is particularly useful, for example, as a fire alarm device; the provision of a thermostat of the class described which is reliable in operation; and the provision of a thermostat of the class described which is relatively simple and economical in construction. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a top plan view of a thermostat embodying the present invention;

Figures 4, 5 and 6 are diagrammatic views illustrating certain principles; and,

Figure 1:
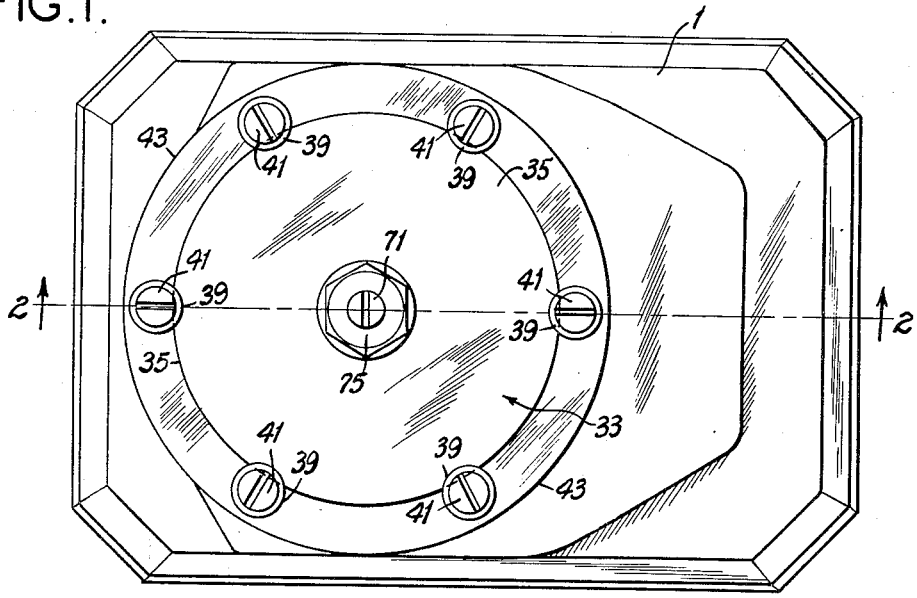

Figures 7, 8, and 9 are vertical cross sections illustrating alternative embodiments of the invention.

Similar reference characters indicate corresponding parts throughout the several views of the drawings.

Thermostats of the composite metallic type as heretofore constructed have usually operated upon the attainment of a predetermined temperature value. That is to say, such thermostats have a setting (say 120° F., for example), upon the attainment of which temperature in the region surrounding the thermostat, the thermostat will undergo a change of position to cause a useful control operation. The composite metallic type thermostat of the present invention, in contradistinction, does not operate upon the attainment of a particular temperature, but only when the rate of temperature change exceeds or diminishes below given values. That is to say, the thermostat of the present invention will operate in a given direction when the rate of temperature change is 15° F. per minute, for example, but will not operate in that direction when the rate of temperature change is less than 15° F. per minute.

One example of the various applications where such a thermostat is desirable, is that of a fire alarm device. Under normal changes of temperature occasioned by weather or seasonal conditions a fire alarm device might be subjected to temperature values ranging from below freezing in winter to, say 120° F. or more in summer.

To adequately cover the maximum temperatures reached in summer, in an unheated warehouse, for instance, an ordinary thermostatic fire alarm (operative on temperature rather than a rate of temperature change) would have to be set to operate at around 130–165° F. to allow a sufficient margin of safety against the possibility of falsely reporting a fire in extreme hot weather.

Now if a fire should break out in the same warehouse in the dead of winter, when inside temperatures were of the order of 32° or less, the operation of the fire alarm thermostat, starting at such a low value and responsive to such a high one, would be greatly delayed, for a fire of given size. Thus, as a fire alarm device the ordinary type of thermostat has the disadvantage of approaching its operating temperature under one set of normal conditions, and being very far from this temperature at another set of normal conditions.

In such a device utilizing the present invention this disadvantage is done away with, so that regardless of what its temperature is at any given time, a change from this value at or above a definite rate, will cause it to operate. If the temperature should change at a slower rate, as it might normally so do from day to day or season to season, then the thermostat would not be responsive to the change.

Figure 2:
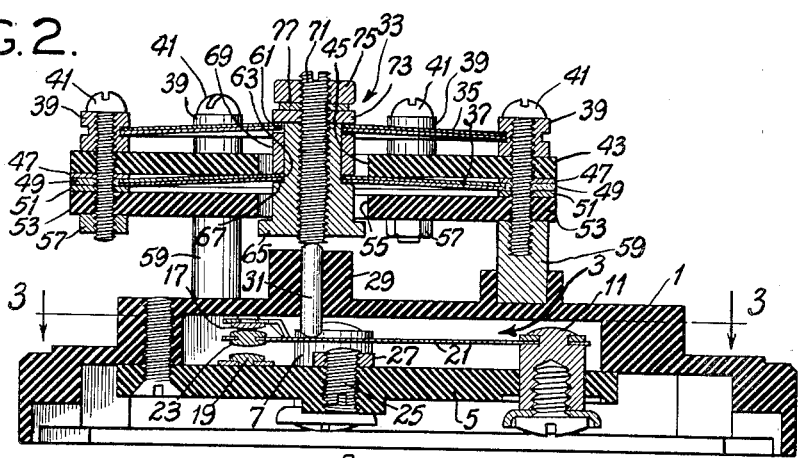
Fig. 2 is a vertical section taken substantially along line 2—2 of Fig. 1.
Figure 3:
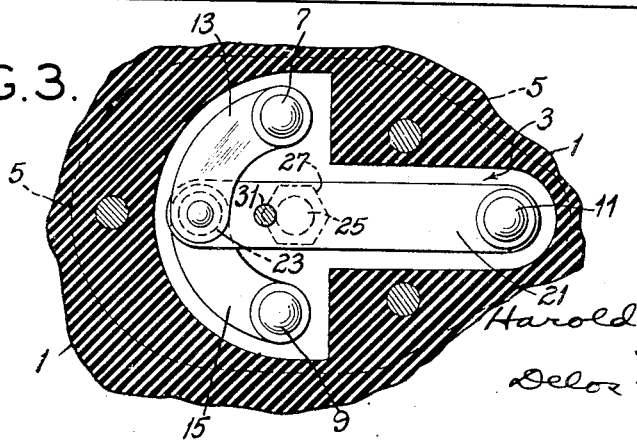
Fig. 3 is a horizontal section taken substantially along line 3—3 of Fig. 2.

One embodiment of the thermostat of the present invention is illustrated in Figures 1, 2 and 3, to which attention is now directed. Numeral 1 indicates a base member, in which is provided a cavity 3. A contact supporting plate 5 normally closes the face of the cavity 3. Mounted on the plate 5 are three terminal members 7, 9 and 11, which extend through the plate and are provided with suitable binding post means for making external electrical connections to the device. Inside the cavity 3, the posts 7 and 9 support arcuate plates 13 and 15, respectively, the inner ends of these plates 13 and 15 overlapping each other and carrying fixed contact button members 17 and 19, respectively. The plates 13 and 15 are so bent that the fixed contacts 17 and 19 are normally separated from each other by a distance substantially equal to the depth of the cavity 3. Post 11 supports a spring contact arm 21, the free end of which carries a movable contact button 23. The positioning of the contact button 23, which extends through the arm 21, is such that it can alternately engage either the fixed contact 17 or the fixed contact 19. The spring contact arm 21 is normally tensioned so that it will maintain the movable contact button 23 in juxtaposition with the fixed contact button 17, rather than the fixed contact button 19.

Threaded into the plate 5 is a slotted screw 25, the inner end of which provides an abutment for limiting the downward movement of the contact spring 21. A lock nut 27 secures the screw 25 in its adjusted position.

Molded or otherwise formed in the base member 1 is a bushing 29, in which slides a pin 31. The lower end of the pin 31 abuts the contact spring 21, while the upper end of said pin 31 extends outside the bushing 29 and is operated by the thermostat proper, indicated generally by numeral 33.

The thermostat 33 is of principal interest in connection with the present invention. The contact system heretofore described, and illustrated, is by way of example only, and any of the contact making and breaking means ordinarily used in connection with thermostats may be satisfactorily substituted therefore. Or, if the thermostat of the present invention is to be used to control a valve, valve elements are substituted for the electrical elements described.

In the rate-of-rise thermostat 33, numerals 35 and 37 indicate a pair of matched thermal elements opposed as to direction of movement in response to temperature change. The elements 35 and 37 are shown in the form of snap-acting discs of the type shown in Spencer Patent 1,448,240, for example, although other forms of thermal elements may also be used in a similar manner. The thermostats 35 and 37 are supported at their peripheries by means presently to be described. Engaging the periphery of the upper disc 35, for example, are a plurality of slotted collar members 39. The collars 39 are all mounted upon machine screws 41. The slots in the collars 39 are sufficiently wide freely to accommodate the thermostatic disc 35 and permit it to move, without obstruction, between its two positions.

Below the collars 39 on the screws 41 there is mounted a circular plate 43, which has a central opening 45. Below the plate 43 on the screws 41 are mounted three annular rings 47, 49 and 51. The inner diameter of the ring 49 is somewhat greater than the inner diameters of the rings 47 and 51, so that a groove-like arrangement is provided for receiving the outer periphery of the thermostatic disc 37. The ring 49 is of suitable thickness so that the thermostatic disc 37 is free to move between its two positions in the groove thus provided.

Below the ring 51, the screws 41 receive a second plate 53, similar to the plate 43, and provided with a central opening 55. Alternate screws 41 are provided with nuts 57 below the plate 53, whereby the thermostat is held in fixed assembly. The screws 41 that do not receive the nuts 57 are threaded into post elements 59, which are mounted on the upper face of base member 1. The posts 59 serve to support the thermostat 33 in operative relation to the contact system heretofore described.

The thermostatic discs 35 and 37 are respectively provided with central openings 61 and 63. Through these openings 61 and 63, and through the openings 45 and 55 in the plates 43 and 53, respectively, extends a hub element indicated by numeral 65. The portion of the hub 65 passing through the openings 61 and 63 is of relatively smaller diameter, and a shoulder 67 provides an abutment against which the inner periphery of the lower thermostatic disc 37 rests. A collar 69 slides on the hub 65 and provides a similar abutment for the upper surface of the inner periphery of disc 37, and for the lower surface of the inner periphery of disc 35. Threaded centrally through the hub 65 is a slotted screw 71, and on the upper end of this slotted screw 71 is mounted a washer 73 which provides an upper abutment for the inner periphery of thermostatic disc 35. A nut 75 holds the washer 73 in position, a spring washer 77 also being a desirable provision. The screw 71 also extends to the lower end of hub member 65, and the end of said screw 71 normally abuts the end of pin 31 which operates the electrical contact system.

By reference to the drawings, it will be noted that the thermostatic disc 35 is fully exposed to surrounding temperature influence, whereas thermostatic disc 37 is somewhat shielded from surrounding temperature influence by plates 43 and 53, and rings 47, 49 and 51.

Leaving the embodiments of Figures 1, 2 and 3 for the moment, attention is directed to Figures 4, 5 and 6, with the aid of which an explanation of the operation of thermostatic discs 35 and 37 will be presented.

Referring now more particularly to Fig. 4, numerals 81 and 83 show diagrammatically thermostatic discs (analogous to the discs 35 and 37 of the Fig. 2 embodiment), which are supported in opposed fashion at their rims, but uncoupled at their centers. Both discs 81 and 83 have a temperature T1 at which they will snap from their normal position when cold to their abnormal position when hot, and a temperature T2 at which both discs 81 and 83 would snap back from their abnormal, hot position to their normal, cold position. Discs 81 and 83 are both assumed, in Fig. 4, to be in their normal, or cold position, and are mounted so that they are dished in opposite directions while in said normal, or cold position. Discs 81 and 83, thus being matched as to characteristics, will theoretically snap towards each other at the same time upon being heated equally to their common critical temperature, say T1. Equal strains will be built up in both discs as uniform heating takes place, and at the time the two discs move to their abnormal hot positions, equal forces would be liberated from each disc. Thus it might be said that for the assumed identical thermostats, their forces are equal and oppositely directed at all times.

In Fig. 5, thermostatic discs 81 and 83 of Fig. 4 have been coupled together with a common hub member 85, so that the centers of the two discs have the same spacing as the rims. Disc 81 is assumed to be in its normal, cold position, but disc 83 is overcentered to its abnormal, hot position, that is to say, the position it would occupy if unrestrained and subjected to a temperature T1 or more. It will be assumed that the surrounding temperature is T3. The temperature-induced forces acting on each of the discs is a function of the difference between the surrounding temperature and the snapping temperature of the discs. That is, with reference to Fig. 5, the temperature-induced upward force tending to keep disc 81 in its upward position is a function of (T1—T3), and the temperature-induced downward force tending to make disc 83 snap downwardly into its normal position is a function of (T2—T3). Temperature T1 is, by assumption, greater than temperature T2. It will therefore be seen that the temperature-induced force upward tending to keep disc 81 in position is greater than the temperature-induced force tending to move disc 83 downwardly. The resultant temperature-induced force is balanced by mechanically induced forces (such as those arising from disc tensions and mechanical stops. But it will clearly be seen that the two discs, as a system, tend to stay in the Fig. 5 position.

In regard to the upward temperature-induced force which tends to keep disc 81 in the position shown in Fig. 5, it is apparent that there is no temperature-induced force in disc 81 tending to make it snap downwardly until temperature T3 reaches temperature T1. The further below T1 temperature T3 is, the greater the temperature-induced force tending to maintain disc 81 in its upward position. If, however, temperature T3 is greater than temperature T1, then the temperature-induced force, being a function of (T3—T1), tends to snap disc 81 downwardly, but at the same time disc 83 is subjected to a temperature-induced force, a function of (T3—T2), tending to hold it in upward position. The latter temperature-induced force is again greater than the former, because T1 is by definition greater than T2, and hence, even when T3 is greater than T1, the system retains its Fig. 5 position.

By a similar analysis it may be shown that, if the system shown in Fig. 5 is manually pushed into its downward or Fig. 6 position, such downward position is maintained for all values of T3, the surrounding temperature, in the same manner as that described for the upward Fig. 5 position of the system.

Thus, if the two discs 81 and 83 are placed in the position shown in Fig. 5, or in the opposite position shown in Fig. 6, they will remain in that respective position indefinitely, regardless of changes in the surrounding temperature.

Referring now more particularly to Fig. 6, dotted lines 87 and 89 diagrammatically represent heat insulating means surrounding thermostatic disc 83 and shielding it from rapid changes in temperature. Disc 81, it will be noted, is not so shielded. The positions of the discs 81 and 83 in Fig. 6 are shown in the reverse from those shown in Fig. 5, indicating that unbalanced forces in the system resulting from a quicker response on the part of disc 81 to a rapid change in temperature than that of disc 83, have caused the structure to assume an opposite position.

On the other hand, if the rate of change of the temperature had been slower, so that there had been no appreciable lag in the response of disc 83 to this change, notwithstanding the shields 87 and 89, sufficient unbalance between discs 81 and 83 would not have occurred, and their joint position would have remained unchanged.

It has been found that by properly proportioning the constants of the two discs and the shields, the system can be made responsive from and at any ordinary rate of change in temperature, but below such value of change, remain unresponsive.

Likewise, it has been found that the system can be designed to be inherently stable in one of two positions up to a certain rate of change, but if the rate increases beyond this value, the system will respond by assuming the other position. In other words, if a system of this sort were forced into a reverse position mechanically or by means other than a rate of temperature change, it would immediately resume its original position when the restraining influence were removed. In this case, the system would respond to a rate of change of temperature, but if this rate lessened sufficiently, the system would then also resume its original position.

There are different methods of accomplishing this. One such method is to stress one of the two thermal elements more than the other so that it dominates the system, either by building such stresses into the element itself or by influencing the element with separate biasing means.

Another method is to provide means limiting the travel of the system in one direction or the other, in what, for want of better terminology, might be called a method of preventing travel past "dead center". Thus, while the system will change its position as far as it can in response to a suitable rate of temperature rise, it is never allowed to pass the point of displacement where it tends, without further stimulation, to continue movement to its opposite position, and hence when the rate-of-rise influence is removed, will return automatically to its original position.

To sum up, useful systems embodying opposed thermal elements as described can be worked out all the way from the one in which the elements are equally balanced, to one in which one of them wholly unbalances the other, in varying degree, the system at the same time being responsive to a rate of temperature change.

Returning now to the embodiments of Figures 1, 2 and 3, the thermostatic disc 35, as previously described, is exposed to temperature changes, and is thus analogous to the disc 81 of Figures 4, 5 and 6, while disc 37 is shielded from temperature changes by cover plates 43 and 53, and spacing rings 47, 49 and 51, and is thus analogous to the disc 83 of Figures 4, 5 and 6. This rate-of-temperature-change responsive system can be any of the different modifications of the principle as outlined above. When temperature changes occur faster than shielded disc 37 can follow them, unshielded disc 35 upsets the balance in the system and snaps it into a downward position, operating the contact system through pin 31 to bring movable contact 23 into juxtaposition with fixed contact 19. Upon return of the rate of temperature change to the previous lower value, the temperature of disc 37 catches up to the temperature of disc 35, and the system 33 can be designed, if desired, either to return to its upwardly conical position, as shown in Fig. 2, thus bringing movable contact 23 into juxtaposition with fixed contacts 17, or to stay in its downward position.

A modification of the system 33 of Fig. 2 is illustrated in Fig. 7. This modification, in addition to the thermostatic discs 35 and 37, has a third thermostatic disc 91, the periphery of which is supported in grooved collars 93 provided on certain of the screws 41, and in grooves 95 on posts 59. A central opening 97 in disc 91 rests on a shoulder 99 specially provided on hub element 65 for this purpose. The purpose of the added disc 91 is to act as a safety or outside temperature limit control. For example, in the case of a fire alarm thermostat, suppose a smoldering fire broke out which caused a gradual increase in temperatures below the rate at which the device was responsive. Under this condition, the device would not operate. Thermostatic disc 91, however, would have a temperature setting of, say, 150° F., so that when temperature builds up to this value, disc 91 would respond by itself and in so doing would force the rest of the system (comprising discs 35 and 37, which are already tending to respond) to change position with it. It will be noted from observation of Fig. 7 that disc 91 would not interfere with the normal operation of discs 35 and 37 below the 150° F. value, if such occurred. The reason for this is that a lost motion or uni-directional linkage couples disc 91 to the system, since the inner periphery of disc 91 abuts the shoulders 99 on the hub 65 only when it moves in one direction.

Fig. 8 illustrates another embodiment of the invention. As before, the principle involved is the lag in temperature change in one of the thermostatic elements with respect to the temperature change of the other thermostatic element. In this embodiment, however, inasmuch as it is desired to obtain a prompt response on reversal of temperature change, the temperature lag of one of the discs with respect to the other is brought about by the method of mounting and shielding one of the discs with material of relatively higher heat capacity and heat conductivity than in the previous embodiment, and in such a manner that the temperature of the shielded disc lags farther behind the temperature of the relatively unshielded disc at the beginning of the temperature change which will operate the device, than it does later on. This is due to the time delay in heat transfer caused by the mass of the mounting and shield. This principle permits of a quick response of the device to a predetermined rate-of-temperature change, but limits the ultimate temperature difference of the two discs to a predetermined value which permits quick return of the device to its original position.

In the Fig. 8 embodiment a thermostatic disc 35 is a relatively unshielded disc as before, and thermostatic disc 37 is somewhat shielded as before, but in a slightly different manner, as will be explained presently. Positioned near disc 35 and insulated from it electrically by a mica guard 101, for example, is an electrical heating element 103, which may take any desired form, being in this instance a helically-wound coil with a more or less circular contour concentric with the rest of the system. The periphery of the disc 35 is mounted by heat-conductive rings 47, 49, and 51, as in the Fig. 7 embodiment.

When heater 103 is energized, the temperature of disc 35 rises quickly, because of radiation from the heater 103 and conduction through the rings 47, 49, and 51, but disc 37, being shielded, lags behind and thus the system operates in the manner heretofore described in response to the temperature change caused by the heating element. In this modification, however, the shield 43 enclosing disc 37 is different from the previously described shield in that it has a relatively higher value of thermal capacity and thermal conductivity. Thus, while disc 35 is exposed to the temperature of the heater 103 substantially directly, the shield 43 surrounding disc 37 absorbs and dissipates a part of this heat. Because of the absorption of heat by shield 43 the disc 37 at first lags greatly behind disc 35. Conduction through rings 47, 49 and 51 and radiation from shield 43 enable disc 37 to catch up and approach the temperature of disc 35. The dissipation of heat by shield 43, however, prevents the temperature of disc 37 from reaching that of disc 35 as long as coil 103 is energized. Temperature equilibrium is not reached between the two elements 35 and 37 as long as the heating coil 103 is energized, so that the system may thus be caused to remain in its responsive position continuously if desired. When coil 103 shuts off, disc 35 cools off rapidly and in a short time reaches and probably passes in a reverse direction the temperature of disc 37. The system may then return to its former position.

A device of the character shown in Fig. 8 is useful in that it may be operated from a remote point with a small input to control associated apparatus having a much larger output, and yet, while essentially a temperature device, it will remain substantially unaffected, or uniformly affected, by changes of surrounding temperature. Ordinary thermal relays while being operable remotely and capable of acting in liaison between control and load circuits, are affected by surrounding temperature to the extent that delayed response results when outside temperatures are low. Thus, the time of operation is relatively fast or slow depending upon the surrounding temperature. However, with the device of the present invention, the surrounding temperature effect is always neutralized, in the manner heretofore described, so that whether the surrounding temperature be high or low, response of the device always occurs within substantially the same time.

Fig. 9 shows an embodiment of the invention that is similar in its operation to the Fig. 7 embodiment. That is to say, the device normally operates upon attainment of an excessive rate of temperature change, but also upon the attainment of a predetermined high limit temperature regardless of the rate of temperature change. The Fig. 9 embodiment is similar to the Fig. 2 embodiment except for the following changes: The hub 65 of the Fig. 2 embodiment is replaced by a hub 105 which provides a shoulder 107 serving as an abutment for the lower side of the inner periphery of disc 37. The hub 105, however, provides no abutment for the upper side of the inner periphery of disc 37. Surmounting hub 105 on screw 71 is a second hub 109 which provides a shoulder 111 serving as an abutment for the lower side of the inner periphery of disc 35, and the washer 73, nut 75, and spring washer 77, as in the Fig. 2 embodiment, provide an abutment for the upper side of the inner periphery of disc 35. This arrangement thus provides that the hub 105 is fastened to disc 35, but there is a lost motion linkage in one direction between the hub 105 and the disc 37. The purpose of the lost motion linkage is to allow one of the discs, namely disc 35, to act independently in one direction to function as the high limit safety control. The snapping temperatures are so set in the discs 35 and 37 that the snapping temperature of disc 35 is the upper limit at which the thermostat is to act as a safety device. The device will act as a rate-of-change thermostat if temperature changes caused by a fire, for example, are great enough. In the case of a smouldering fire, however, where changes are not great enough to cause the two discs to work together, then disc 35 alone will snap downward when the temperature is reached corresponding to its snapping temperature. At this temperature disc 35 snaps downwardly by itself without moving disc 37, to effect a change of contact position in the usual manner.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A thermostat comprising a pair of thermostatically responsive elements each comprising a snap-acting composite thermostatic metal plate, means mounting said elements in predetermined relationship to each other, in such manner that said elements tend to move in opposite directions in response to temperature change, means controlled as to position by said elements and engaging both of said elements in such a manner that each of said elements is at all times maintained in the same position with respect to the other element, said elements having a joint position of stability and remaining in said position regardless of the ambient temperature value, and means causing one of said elements to respond to temperature change more quickly than the other of said elements, whereby said elements jointly move away from said position of stability in response to rates of change of ambient temperature.

2. A thermostat comprising a pair of thermostatically responsive elements, means mounting said elements in predetermined relationship to each other, in such manner that said elements tend to move in opposite directions in response to temperature change, means controlled as to position by said elements and engaging both of said elements in such a manner that each of said elements is at all times maintained in the same position with respect to the other element, regardless of temperature change, and means causing one of said elements to respond to temperature change more quickly than the other of said elements, each of said elements comprising a snap-acting composite thermostatic metal plate.

3. A thermostat comprising a pair of snap-acting composite thermostatic metal thermostats each of which tends to move in response to changes of temperature, means mounting said thermostats in such manner that their said tendency to move is brought about in opposite directions, and means connecting the movable portions of said thermostats together in such manner that the system comprising the two thermostats is substantially stable in at least one position, regardless of ambient temperature value, so long as said thermostats do not differ in temperature more than a predetermined amount, and heat-insulating means causing one of said thermostats to respond to changes of ambient temperature more quickly than the other thermostat.

4. A thermostat comprising a pair of snap-acting composite thermostatic metal thermostats each of which tends to move in response to changes of temperature, means mounting said thermostats in such manner that their said tendency to move is brought about in opposite directions, and means connecting the movable portions of said thermostats together in such manner that the system comprising the two thermostats is substantially stable in at least one position, regardless of ambient temperature value, so long as said thermostats do not differ in temperature more than a predetermined amount, one of said thermostats being initially stressed to a slightly greater extent than the other of said thermostats whereby it dominates the system.

5. A thermostat comprising a pair of snap-acting composite thermostatic metal thermostats each of which tends to move in response to changes of temperature, means mounting said thermostats in such manner that their said tendency to move is brought about in opposite directions, and means connecting the movable portions of said thermostats together in such manner that the system comprising the two thermostats is substantially stable in at least one position, regardless of ambient temperature value, so long as said thermostats do not differ in temperature more than a predetermined amount, and heat insulating means surrounding one of said thermostats, the heat insulating characteristics of said means being such that for normal rates of change of temperature, the two thermostats are maintained at substantially the same temperature, but when an abnormal rate of change of temperature takes place, one of the thermostats is affected more quickly than the other thermostat, whereby the system itself changes its position.

6. A thermostat comprising a pair of snap-acting composite thermostatic metal thermostats each of which tends to move in response to changes of temperature, means mounting said thermostats in such manner that their said tendency to move is brought about in opposite directions, and means connecting the movable portions of said thermostats together in such manner that the system comprising the two thermostats is substantially stable in at least one position, regardless of ambient temperature value, so long as said thermostats do not differ in temperature more than a predetermined amount, and heat insulating means surrounding one of said thermostats, the heat insulating characteristics of said means being such that for normal rates of change of temperature, the two thermostats are maintained at temperatures not differing more than a predetermined amount, but when an abnormal rate of change of temperature takes place, one of the thermostats is affected more quickly than the other thermostat, whereby the system itself changes its position, and control means associated with said thermostatic system and adapted to be operated by the change of position thereof.

7. A thermostat comprising a pair of thermostats each of which tends to move in response to changes of temperature, means mounting said thermostats in such manner that their said tendency to move is brought about in opposite directions, and means connecting the movable portions of said thermostats together in such manner that the system comprising the two thermostats is substantially stable in at least one position, regardless of ambient temperature value, so long as said thermostats do not differ in temperature more than a predetermined amount, said thermostats comprising snap-acting composite thermostatic metal plates.

8. A thermostat comprising a pair of thermostats each of which tends to move in response to changes of temperature, one of which is constructed or arranged so that it responds more quickly to temperature changes than the other, means mounting said thermostats in such manner that their said tendency to move is brought about in opposite directions, and means connecting the movable portions of said thermostats together in such manner that the system comprising the two thermostats is substantially stable in at least one position, regardless of ambient temperature value, so long as said thermostats do not differ in temperature more than a predetermined amount, said thermostats comprising dished composite thermostatic metal discs mounted concentrically and in parallel spaced relationship, with their peripheries and central portions spaced apart substantially the same distance.

9. A thermostat comprising a pair of dished, composite thermostatic metal discs, one of which is constructed or arranged so that it responds more quickly to temperature changes than the other, each of said discs tending to change its direction of concavity in response to temperature changes, means mounting said discs concentrically and in a parallel manner at their peripheries, and movable means engaging the inner movable portions of said discs and spacing them apart substantially the same distances as the peripheries of said discs are spaced apart, said discs, however, being so faced that they tend to move in opposite directions in response to a given change of temperature.

10. A thermostat comprising a pair of dished, composite thermostatic metal discs, one of which is constructed or arranged so that it responds more quickly to temperature changes than the other, each of said discs tending to change its direction of concavity in response to temperature changes, means mounting said discs concentrically and in a parallel manner at their peripheries, and movable means engaging the inner movable portions of said discs and spacing them apart substantially the same distances as the peripheries of said discs are spaced apart, said discs, however, being so faced that they tend to move in opposite directions in response to a given change of temperature, and control means associated for movement with said movable means.

11. A thermostat comprising a pair of dished, composite thermostatic metal discs, each of said discs tending to change its direction of concavity in response to temperature changes, means mounting said discs concentrically and in a parallel manner at their peripheries, and movable means engaging the inner movable portions of said discs and spacing them apart substantially the same distances as the peripheries of said discs are spaced apart, said discs, however, being so faced that they tend to move in opposite directions in response to a given change of temperature, and means causing one of said discs to respond to temperature changes more quickly than the other disc.

12. A thermostat comprising a pair of dished, composite thermostatic metal discs, each of said discs tending to change its direction of concavity in response to temperature changes, means mounting said discs concentrically and in a parallel manner at their peripheries, and movable means engaging the inner movable portions of said discs and spacing them apart substantially the same distances as the peripheries of said discs are spaced apart, said discs, however, being so faced that they tend to move in opposite directions in response to a given change of temperature, heating means positioned in juxtaposition to one of said discs and adapted to heat the same, and heat-dissipating means positioned between the two discs and preventing the second disc from receiving heat from said heating means as quickly as does the first disc.

13. A thermostat comprising a pair of dished, composite thermostatic metal discs, each of said discs tending to change its direction of concavity in response to temperature changes, means mounting said discs concentrically and in a parallel manner at their peripheries, and movable means engaging the inner movable portions of said discs and spacing them apart substantially the same distances as the peripheries of said discs are spaced apart, said discs, however, being so faced that they tend to move in opposite directions in response to a given change of temperature, and a third thermostatic disc mounted parallel to the aforesaid two thermostatic discs and concentrically therewith, and engaging the last-named means, said third thermostatic disc developing greater force in response to temperature change than does the combination of the other two thermostatic discs, whereby it dominates the system comprising the three thermostatic discs.

14. A thermostat comprising a pair of dished, composite thermostatic metal discs, each of said discs tending to change its direction of concavity in response to temperature changes, means mounting said discs concentrically and in a parallel manner at their peripheries, and movable means engaging the inner movable portions of said discs and spacing them apart substantially the same distances as the peripheries of said discs are spaced apart, said discs, however, being so faced that they tend to move in opposite directions in response to a given change of temperature, and a third thermostatic disc mounted parallel to the aforesaid two thermostatic discs and concentrically therewith, said third thermostatic disc having a lost-motion engagement with said last-named means, said third thermostatic disc likewise developing a greater force in response to changes of temperature than does the combination of the other two thermostatic discs, whereby, in one direction of movement, said third thermostatic disc dominates the system comprising the three thermostatic discs.

15. A thermal device comprising a thermostat having such characteristics that it undergoes change of position only in response to the development of a rate of temperature change in excess of a predetermined rate, and is non-responsive by change of position at any temperature not brought about by a rate of change of temperature at least equal to said predetermined value, and separate heating means mounted in juxtaposition to said thermostat and adapted, upon actuation thereof, to provide a rate of temperature change of such magnitude as to cause the said thermostat to change its position.

16. A control device comprising a pair of snap-acting thermostatic elements which undergo movement in response to temperature changes, means mounting said elements, and means interconnecting said elements in such manner that one of said elements cannot move in one direction without at the same time moving the other of said elements, but can move freely of the other element in the other direction.

17. A control device comprising a pair of snap-acting thermostatic elements which undergo movement in opposite directions in response to temperature changes, means mounting said elements, and means interconnecting said elements in such manner that at least one of said elements cannot move in at least one direction without at the same time moving the other of said elements, said interconnecting means comprising a lost motion engagement.

18. A thermostat comprising a pair of dished, composite thermostatic metal discs, each of said discs tending to change its direction of concavity in response to temperature changes, means mounting said discs concentrically and in a parallel manner at their peripheries, and movable means engaging the inner movable portions of said discs and spacing them apart substantially the same distances as the peripheries of said discs are spaced apart, said discs, however, being so faced that they tend to move in opposite directions in response to a given change of temperature, said last-named means including a lost-motion connection, whereby one of the said discs may move in one direction without at the same time moving the other disc.

HAROLD M. WILSON.